(12) United States Patent
Kieman et al.

(10) Patent No.: US 6,963,782 B1
(45) Date of Patent: *Nov. 8, 2005

(54) SYSTEM AND METHOD FOR EFFECTING CONTROL TUNING OF A MANUFACTURING PROCESS

(75) Inventors: Steve Kieman, Westerville, OH (US); David Honigford, Grove City, OH (US)

(73) Assignee: Automation and Control Technology, Inc., Dublin, OH (US)

( * ) Notice: Subject to any disclaimer, the term of this patent is extended or adjusted under 35 U.S.C. 154(b) by 237 days.

This patent is subject to a terminal disclaimer.

(21) Appl. No.: 10/413,664

(22) Filed: Apr. 15, 2003

Related U.S. Application Data

(63) Continuation of application No. 09/996,317, filed on Nov. 20, 2001, now Pat. No. 6,675,073.

(51) Int. Cl.[7] .............................................. G05B 13/02
(52) U.S. Cl. ........................ 700/37; 700/42; 700/45; 700/109; 700/128; 702/128; 702/155; 702/166; 702/172; 702/175; 702/180
(58) Field of Search ..................... 700/28, 32, 37, 700/40–45, 108, 109, 127, 128; 702/128, 702/130, 138, 142, 155, 156, 166, 170, 172, 702/173, 175, 179–181, 17

(56) References Cited

U.S. PATENT DOCUMENTS

| | | | |
|---|---|---|---|
| 3,622,448 A * | 11/1971 | Adams et al. ............... 162/198 |
| 4,920,998 A * | 5/1990 | Deitrick et al. ................. 137/3 |
| 5,068,796 A * | 11/1991 | Hellenguard et al. ........ 700/127 |
| 5,091,844 A * | 2/1992 | Waltz ........................... 700/33 |
| 5,130,920 A * | 7/1992 | Gebo ........................... 700/31 |
| 5,627,372 A | 5/1997 | Sturm ........................ 250/308 |
| 5,687,092 A * | 11/1997 | Bretmersky et al. ......... 702/100 |
| 6,091,887 A * | 7/2000 | Dieterle et al. ............. 388/811 |
| 6,128,541 A | 10/2000 | Junk ........................... 700/39 |

* cited by examiner

*Primary Examiner*—Anthony Knight
*Assistant Examiner*—Crystal J. Barnes
(74) *Attorney, Agent, or Firm*—Standley Law Group LLP

(57) ABSTRACT

The present invention includes a system and method for fine tuning the control of a manufacturing process. A material adjusting device is in communication with a PID controller and PID control loop, and is used to alter a flow of material used in the manufacturing process, so as to maintain a target physical property of the material at a setpoint. A measurement device captures measurements of the flow relevant to the physical property of interest. A change is introduced to the material adjusting device while the PID controller and PID control loop are disabled, and appropriate measurements of the flow are continually captured; a process that may be repeated several times. Once sufficient physical property measurement data has been captured, the data is loaded into an optimization program that outputs optimized controlled parameters that may be used by the PID controller and control loop to better control the physical property of the material.

19 Claims, 2 Drawing Sheets

SYSTEM AND METHOD FOR EFFECTING CONTROL TUNING OF A MANUFACTURING PROCESS

This application is a continuation of U.S. patent application Ser. No. 09/996,317, filed Nov. 20, 2001, now U.S. Pat. No. 6,675,073.

BACKGROUND AND SUMMARY OF THE INVENTION

The present invention relates generally to control tuning in a manufacturing process. Specifically, the invention relates to the optimization of a process control device when measuring and controlling the physical properties of articles moving through a manufacturing process.

Industrially manufactured products, such as, for example, tobacco cigarettes, extruded plastics, or steel billets, vary widely in physical makeup. The speed of movement of these materials as they are being processed may also vary widely. Some processes may move a work piece at a very slow rate of speed, while others move a work piece at speeds upwards of 40 mph.

However, in each of these manufacturing processes an ongoing need exists to measure and control the physical properties of the articles being made. Several devices have been designed and utilized to provide consistency in the physical properties of a line of manufactured articles. These devices may monitor such properties as length, weight, texture, and so forth. The results of this monitoring may be used to adjust parameters of the production process.

Differences between a target measurement for a given physical property of a manufactured article and its actual measurement can lead to excessive scrap, wasted machine time or lost orders, as the end product may be rejected by a demanding customer. Known systems have failed to provide for adequate control over the properties of such manufactured articles, due at least in part to their attempts to monitor and adjust the manufacturing process based on the short term standard deviation of a measured property, for example, the weight deviation from a target weight. Therefore, a need exists for a system and method of ensuring that the finished properties of a manufactured article come as close as possible to corresponding target values.

The present invention satisfies this need. The system and method of the present invention examines long term standard deviation that occurs during the manufacturing process and makes adjustments accordingly. For example, in one particular embodiment of the present invention, a system and method for measuring and controlling the weight of a flow of material is contemplated. More generally, however, the present invention provides a system and method for "fine tuning" a manufacturing process to more accurately produce a given article.

According to the system and method of the present invention, measurements of a particular physical property of a flow of material are captured at synchronized intervals over the length of the flow, and proportional and integral calculations are thereafter performed on these measurements. A measurement device is preferably used to capture the desired measurements of the physical property of the material at proper intervals. A material adjusting device, in communication with a controller and control loop, is preferably used to alter one or more process parameters so as to sufficiently maintain the particular physical property of the material at a target setpoint. Based on the results of the proportional and integral calculations, the flow of material may be acted upon to compensate for the duration of any deviation in the measurements from a target set point, and further deviations may be anticipated such that the total amount of deviation is reduced.

The system and method of the present invention preferably employs a proportional, integral, derivative (PID) algorithm and control loop to make the calculations and adjustments necessary to fine tune the action of a particular material adjusting device. In certain embodiments of the present invention, preferably only the proportional and integral portions of the PID algorithm are utilized, although the derivative portion may also be used if desired.

Essentially, the proportional portion of the control loop measures the error or deviation between a setpoint physical property value and a measured physical property value of the flow of material. Under proportional control, an attempt is made to adjust the output of a material adjusting device so that any error between the setpoint physical property value and a measured physical property value is removed. This is accomplished by the amount of change that will occur in the output of the material adjusting device as a result of a change to a corresponding input thereof. With error and gain known, the bias of the PID controller may then be adjusted (or the controller "reset") in order to move the output of the material adjusting device as necessary to cause the physical property of interest to reach the setpoint value. The integral portion of the PID control loop is then used to continually and more accurately adjust the bias of the controller. Without the integral portion of the control loop, bias adjustments to the controller would have to be accomplished manually. To more accurately tune the device, the integral portion of the PID control loop may effect an automatic bias adjustment (automatic reset) whenever an error between the setpoint value and measured value are detected.

To accomplish fine tuning, small adjustments (bumps) are periodically and manually made to the input of the material adjusting device. In response to the input change, the output of the material adjusting device will cause movement thereof for a specified amount of time. Individual physical property measurements are taken, preferably from a time before each bump to the input is initiated, through a time after the output has fully responded to the change in the input. Physical property measurements are collected for each of the bumps, and the collected data is fed into an optimization program. Based on the collected data it receives, the optimization software can then generate tuned control parameters for use by the PID control loop. Therefore, by utilizing the tuned control parameters, the system and method of the present invention allows the mean value of the physical property to be more quickly and more accurately adjusted and controlled than is possible with known systems and methods.

BRIEF DESCRIPTION OF THE DRAWINGS

In addition to the novel features and advantages mentioned above, other objects and advantages of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

The present invention is directed to a system and method for fine tuning the control of a manufacturing process, such as, for example the weight control of a material flow. Known systems have attempted to tune applicable manufacturing devices by measuring the short term standard deviaton of one or more properties of the material affected by the manufacturing devices, and then subsequently making corresponding adjustments to the devices. In contrast, the present system and method is concerned with calculating long term standard deviation, and calculating and implementing tuned parameters for use by a PID control loop that enables more accurate and timely physical property adjustments to be accomplished.

Figure 1:
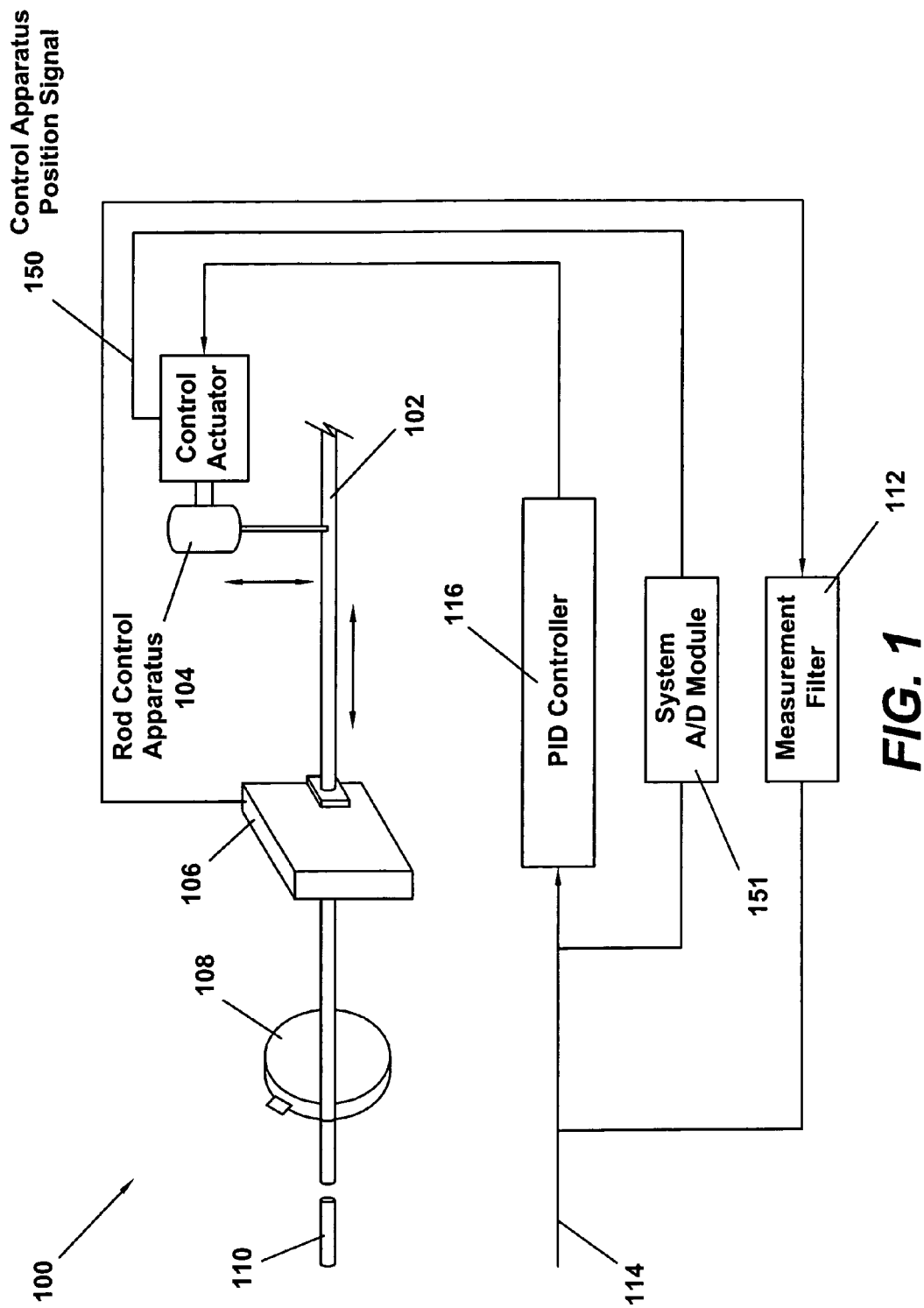
FIG. 1 is a diagram of one embodiment of an apparatus of the present invention.

An exemplary system 100 of the present invention is illustrated in the diagram of FIG. 1. In this particular system, a flow of material 102 is passed to a measurement sensor 106. The measurement sensor 106 may be any appropriate sensor for making precise measurements of a physical property of interest over the length of the material flow 102, and may utilize, for example, microwave, or x-ray technology for fast, highly accurate measurement. The measurement sensor 106 may measure the physical property of interest at or near a multitude of points along the length of the material flow 102. The measurements obtained by the measurement sensor 106 may be recorded at a rate exceeding, for example, one hundred thousand per minute. A true calibration curve is preferably used to determine the physical property of interest, thereby eliminating errors inherent in conventional straight-line approximations. The flow of material 102 acted upon by the system of the present invention may be cut, such as by a knife cutter 108, into individual segments 110.

Measurements taken from the measurement sensor or sensor unit 106 are sent to a proportional, integral, derivative (PID) control loop, which determines the corrections to be transmitted to a material adjusting device 104. The material adjusting device 104 is preferably employed to alter a particular physical property of the material flow 102. For example, in one particular embodiment of the present invention adapted for use in the manufacture of tobacco cigarettes, a rod control apparatus employs a horizontally situated trimmer that removes more tobacco from an underlying suction band when moved closer to a flow of tobacco, and allows more tobacco to remain on the underlying suction band when moved farther away from the flow of tobacco.

A PID control loop and PID controller 116 utilizing the derivative portion thereof may be used in order to more accurately and efficiently control the physical property of interest, and to automatically compensate for process dynamics and the time delay between control actions and system measurements. However, the derivative portion of the PID control loop is not used (gain is set to 0) in this particular embodiment of the present invention. Even without the derivative portion of the PID control loop, the combination of the proportional and integral control still provides fast, stable response with low-error tracking of the target physical property. The PID control loop may preferably use a first measurement filter 112 to filter out any extraneous data sent by the measurement unit 106, such as glitches or extreme readings due to misplaced or miscut material. This filtered measurement data is then preferably compared to the target physical property data 114 and passed to the PID controller 116.

The PID controller 116 allows adjustment of the output signal sent to the material adjusting device 104 based on the duration of any measured error, not just the magnitude of that error as in previous systems. Consequently, as long as an error offset exists, the integral portion of the PID control loop may continue to cause adjustment of the material adjusting device 104 in an attempt to reduce the error measurement to zero. A system of the present invention may employ a control apparatus position signal 150 that is a "feed back" position signal into the system A/D module 151 and is used to monitor whether the rod control apparatus 104 is on a limit.

Figure 2:
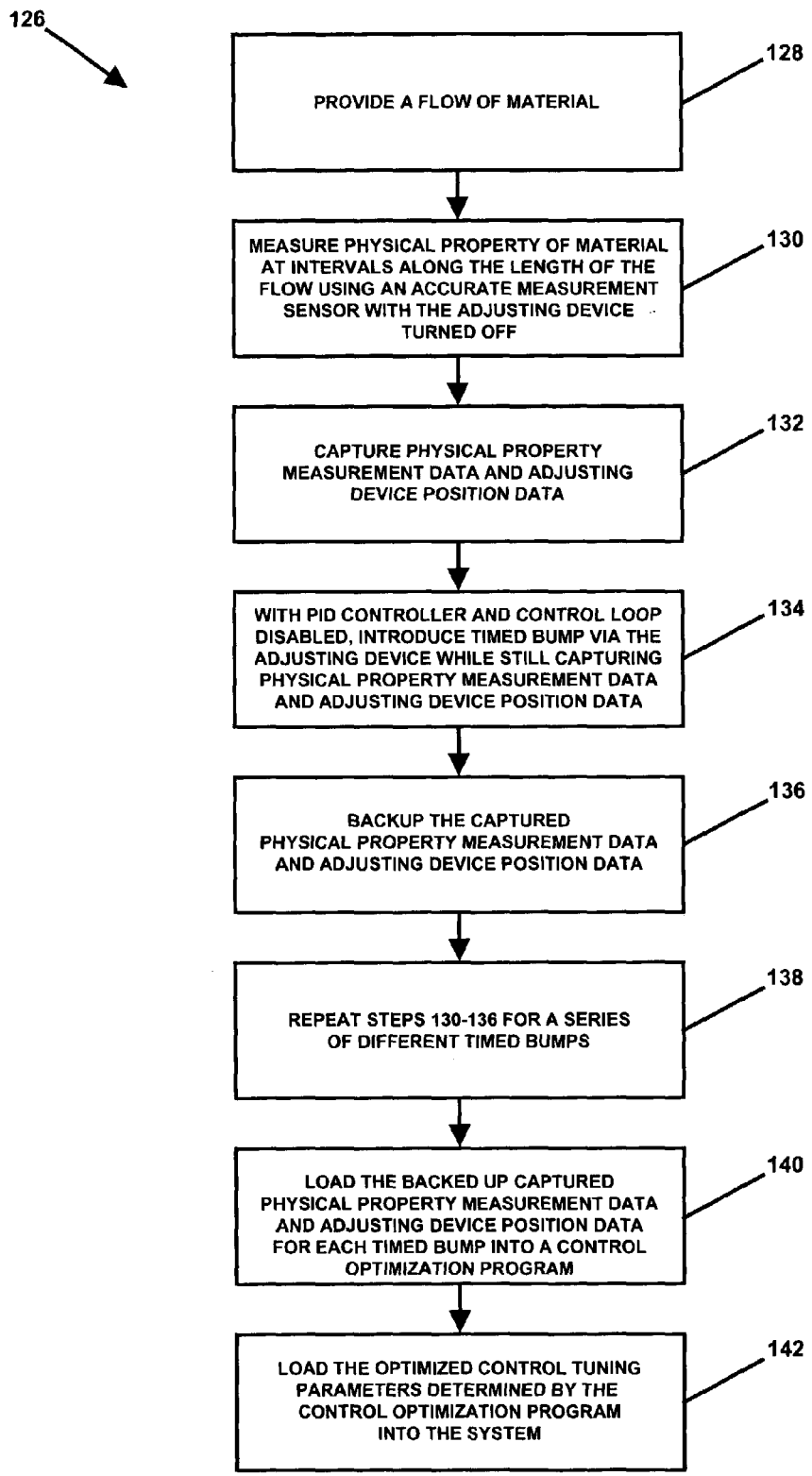
FIG. 2 is a flow chart showing the basic steps of a proportional, integral (PI) control tuning method in accordance with one embodiment of the present invention.

The steps of a first preferred method 126 of fine tuning a manufacturing process control system according to the present invention are shown generally in FIG. 2. In this method, a flow of material is provided 128 through a manufacturing process. With the material adjusting device 104 turned off, and using a sufficiently accurate measurement sensor 106 or other measurement device, the physical property of interest is measured 130 at multiple, predetermined intervals. In this manner, the measurement data relating to the physical property of interest may then be captured 132 and stored.

After capturing individual physical property data 132, and with the PID controller and PID control loop disabled, a timed bump, or step, is preferably introduced to the input of the controller 134 by briefly manually activating the material adjusting device 104. The material adjusting device 104 will then move, as directed, toward or away from the flow of material 102 for the amount of time input thereto. Movement of the material adjusting device 104 will generally result in a change in the physical property of interest. An observable change in the physical property of interest may lag somewhat behind the activation of the material adjusting device 104, and the full effect of the bump will typically occur gradually as the material adjusting device completes its movement. Thus, it is preferable that individual measurement data be continually captured and stored 136 for a predetermined period of time—preferably before, during and after initiation of the bump. In this manner, measurement data may be obtained prior to the change in the output caused by the bump and compared with measurement data collected after the change in the output is completed.

Preferably, steps 130–136 are repeated for a series of different timed bumps 138 that are initiated over some interval. Each bump may be initiated, for example, to coincide with the passage of a particular amount of the material 102 that will produce data sufficient to analyze the change of the physical property of interest. For example, when the method of the present invention is used in the production of tobacco cigarettes, a timed bump may be manually initiated within approximately a 5,000 cigarette interval.

A number of different timed bumps are preferably initiated, so that an adequate slope may be developed from the resulting data and charted. While various numbers of different timed bumps may prove sufficient, it has been found that a minimum of approximately 6 bumps is required to provide an accurate assessment of the response. Although more than 6 bumps may also be performed, the accomplishment of additional bumps also adds time to the fine tuning process. In the system of the present invention illustrated in FIG. 1, it is also preferable that the timed bumps be of both positive and negative value (3 of each, for example), meaning that the material adjusting device 104 will move some distance both further from, and nearer to the material flow 102. This method is preferably utilized in conjunction with the system of FIG. 1, because as the material adjusting device 104 moves both with and against the force of gravity, different amounts of energy must be applied to its input to effect a similar change in its output.

The measurement data initially collected, and the measurement data collected during the series of preferably different timed bumps, is then preferably stored, properly compiled, and loaded into a control optimization program 140. Suitable control optimization software is commercially available, such as, for example, MATLAB software, and preferably runs on a PC or other suitable computing device. Based on the collected data it receives, the control optimization software generates tuned control parameters which may then be input into the control system 142 of the present invention. The tuned control parameters allow the PID controller and control loop to more quickly and accurately adjust and control the mean value of the physical property of interest and the affected characteristic(s) of subsequently produced articles than would otherwise be possible.

From the foregoing discussion and description of the exemplary embodiment, it can be seen that the system and method of the present invention allows for a physical property of a flow of material used in a manufacturing process to be more quickly and accurately adjusted to conform to a predetermined setpoint. While certain embodiments of the present invention are described in detail above to allow one skilled in the art to practice the invention, the scope of the invention is not to be considered limited by such disclosure, and modifications are possible without departing from the spirit of the invention as evidenced by the following claims:

What is claimed is:

1. A system for measuring and controlling one or more physical properties of a material flow during a manufacturing process, said system comprising:
    at least one measurement device adapted to capture measurements of a particular physical property of said material flow at predetermined intervals;
    a material adjusting device adapted to alter said particular physical property of said material flow in order to maintain said physical property at a target setpoint;
    at least one PID controller in communication with at least one PID control loop, said control loop utilizing at least a proportional portion and an integral portion thereof to detect deviations between setpoint physical property values and measured physical property values at points along said material flow and to automatically adjust said material adjusting device in response thereto; and
    optimization software for receiving compiled physical property measurement data collected from a period prior to, and subsequently of, one or more changes to an input of said controller, said optimization software adapted to use said compiled physical property measurement data to calculate optimized parameters for allowing said PID controller and said PID control loop to more quickly and accurately adjust said material adjusting device to eliminate said deviations.

2. A system according to claim 1, additionally comprising at least one measurement filter adapted to filter said physical property measurements.

3. A system according to claim 1, wherein said material flow is separated into individual segments, each segment having identifiable measurement data associated therewith.

4. A system according to claim 1, wherein said measurement device utilizes microwave technology for accomplishing said physical property measurements.

5. A system according to claim 1, wherein said measurement device utilizes x-ray technology for accomplishing said physical property measurements.

6. A system according to claim 1, wherein said measurement device comprises a fast-response ionization chamber.

7. A system according to claim 1, wherein said PID controller is adapted to adjust the output signal sent to said material adjusting device based on the duration of any measured deviation, not just the magnitude of the deviation.

8. A system according to claim 1, further comprising a derivative control loop in communication with said PID controller and said material adjusting device, said derivative loop adapted to perform derivative calculations on said physical property measurements such that said PID controller can adjust said material adjusting device in a manner that is proportional to the rate of change of said deviations, and whereby said deviations may further be anticipated and the total amount of said deviation reduced.

9. A system according to claim 1, additionally comprising at least one user interface.

10. A system according to claim 9, wherein said user interface is adapted to allow tuning and configuration of said material flow.

11. A system according to claim 1, wherein more than one physical property of said material flow is measured and controlled.

12. A method for fine tuning the control of one or more physical properties of a flow of material, said method comprising:
    (a) providing a flow of material that may be controlled by a PID controller in communication with a PID control loop;
    (b) taking measurements of a particular physical property of said flow at predetermined intervals;
    (c) storing said measurements in a manner such that a predetermined number of identifiable measurements may be associated with a particular length of said flow;
    (d) initiating the timed movement of a device adapted to adjust said physical property of said flow, said movement causing a change in said physical property of said flow and a corresponding change to an input of said PID controller adapted to receive said physical property measurements;
    (e) capturing and storing said physical property measurements of said flow according to steps (b)–(c) from at least the time coinciding with initiation of said timed movement, to at least the time coinciding with the completion of the change in said physical property of said flow;
    (f) repeating steps (d)–(e) a desired number of times at predetermined intervals;
    (g) compiling all of said stored physical property measurements and loading said compiled physical property measurements into an optimization program adapted to output optimized control parameters; and
    (h) loading said optimized control parameters into said PID controller such that said flow of material may be adjusted thereby using said control loop.

13. The method of claim 12, further comprising providing a data storage unit for receiving and storing a multitude of different measurement data from a plurality of different measurement sensors.

14. The method of claim 12, additionally comprising the step of filtering said physical property measurements.

15. The method of claim 12, wherein only a proportional and integral portion of said PID controller and control loop is used to control said physical property of said flow of material.

16. The method of claim 12, further comprising the use of a derivative portion of said PID controller and control loop to control said physical property of said flow of material.

17. The method of claim 12, wherein said physical property measurements are taken and stored from a time prior to initiation of said timed movement, to a time subsequent to the completion of the change in said physical property of said flow caused by said timed movement.

18. The method of claim 12, wherein more than one physical property of said flow of material is measured and controlled.

19. The method of claim 12, wherein said flow of material is separated into individual segments, each of which has identifiable measurement data associated therewith.

* * * * *

UNITED STATES PATENT AND TRADEMARK OFFICE
CERTIFICATE OF CORRECTION

| | | |
|---|---|---|
| PATENT NO. | : 6,963,782 B1 | Page 1 of 1 |
| APPLICATION NO. | : 10/413664 | |
| DATED | : November 8, 2005 | |
| INVENTOR(S) | : Kieman et al. | |

It is certified that error appears in the above-identified patent and that said Letters Patent is hereby corrected as shown below:

On the Title Page, Item (12) please delete "Kieman et al." and insert --Kiernan et al.--

On the Title Page, Item (75) Inventors please delete "Steve Kieman," and insert --Stephen J. Kiernan,--

Signed and Sealed this

Eighteenth Day of September, 2007

JON W. DUDAS
*Director of the United States Patent and Trademark Office*